United States Patent [19]

van der Linden et al.

[11] Patent Number: 4,732,412
[45] Date of Patent: Mar. 22, 1988

[54] COATED RECOVERABLE ARTICLES

[75] Inventors: Roger D. A. van der Linden, Antwerp; Lucien G. Meeus, Heist-op-den-berg, both of Belgium

[73] Assignee: NV Raychem S.A., Kessel-lo, Belgium

[21] Appl. No.: 942,937

[22] Filed: Dec. 19, 1986

Related U.S. Application Data

[63] Continuation of Ser. No. 435,168, Oct. 19, 1982, abandoned.

[30] Foreign Application Priority Data

Oct. 27, 1981 [GB] United Kingdom ................ 8132397

[51] Int. Cl.$^4$ ............................................ F16L 11/12
[52] U.S. Cl. ........................................ 285/47; 285/93; 285/138; 285/293; 285/294; 285/381; 285/915; 138/99; 156/86; 174/DIG. 8; 428/349; 428/913
[58] Field of Search ................... 285/381, 294, 47, 53, 285/138, 293, 369, 373, 15, 93, 915; 174/DIG. 8; 156/86; 428/63, 349, 913; 138/99

[56] References Cited

U.S. PATENT DOCUMENTS

| | | |
|---|---|---|
| 3,297,819 | 1/1967 | Wetmore . |
| 3,415,287 | 12/1968 | Heslop et al. ............... 285/DIG. 16 |
| 3,677,303 | 7/1972 | Martin ............... 285/294 X |
| 3,731,710 | 5/1973 | Bauer ............... 285/294 X |
| 3,743,329 | 7/1973 | Wesel ............... 285/DIG. 16 |
| 3,744,823 | 7/1973 | Muir et al. . |
| 4,019,761 | 4/1977 | Heidemann ............... 285/381 |
| 4,084,842 | 4/1978 | Stonitsch et al. . |
| 4,087,588 | 5/1978 | Shida et al. . |
| 4,144,404 | 3/1979 | DeGroef et al. ............... 174/DIG. 8 |
| 4,221,405 | 9/1980 | Stonitsch ............... 285/381 X |
| 4,344,909 | 8/1982 | De Blauwe ............... 285/381 X |
| 4,346,196 | 8/1982 | Hoh et al. . |
| 4,465,309 | 8/1984 | Nimke ............... 285/381 X |

FOREIGN PATENT DOCUMENTS

| | | |
|---|---|---|
| 0035851 | 9/1981 | European Pat. Off. . |
| 1939166 | 2/1971 | Fed. Rep. of Germany . |
| 143101 | 7/1980 | Fed. Rep. of Germany ...... 285/381 |
| 2901301 | 7/1980 | Fed. Rep. of Germany . |
| 52-47137 | 10/1977 | Japan . |
| 1041065 | 9/1966 | United Kingdom . |
| 1076336 | 7/1967 | United Kingdom . |
| 1078559 | 8/1967 | United Kingdom . |
| 1167517 | 10/1969 | United Kingdom . |
| 1483143 | 8/1977 | United Kingdom . |
| 1542609 | 3/1979 | United Kingdom . |
| 2048720 | 12/1980 | United Kingdom . |

Primary Examiner—Dave W. Arola
Attorney, Agent, or Firm—Edith A. Rice; Herbert G. Burkard

[57] ABSTRACT

A recoverable polymeric material is coated with discrete regions of a sealant, such as a mastic, and of a heat-activatable adhesive, such as a hot-melt adhesive. The coated material forms a sleeve which may be of tubular or wrap-around configuration. The sleeve may be used to cover weld joints in polyethylene coated steel pipes. The sealant ensures a flexible water-proof seal around the weld and the adhesive provides a second seal and prevents any long range movement between the sleeve and the pipe.

24 Claims, 7 Drawing Figures

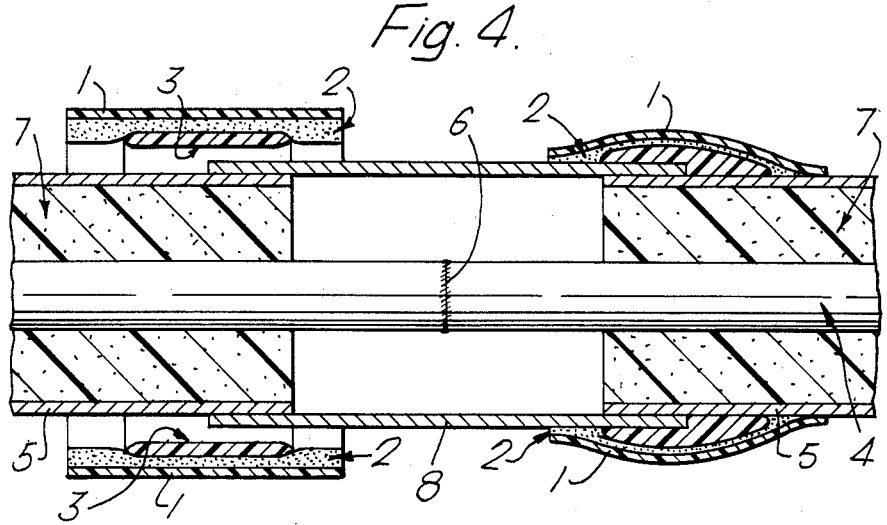
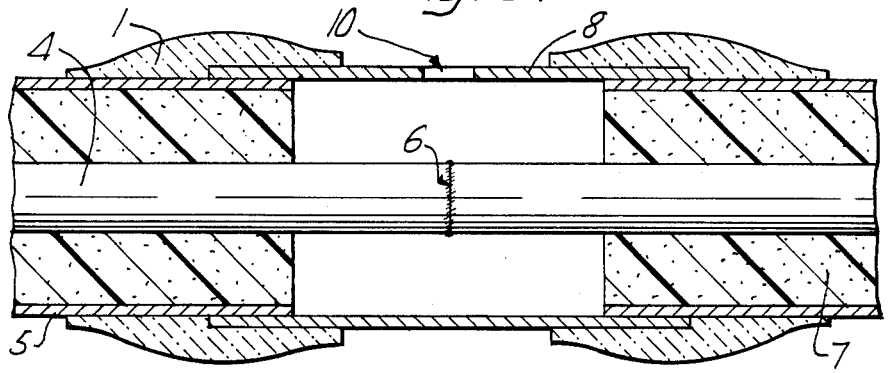
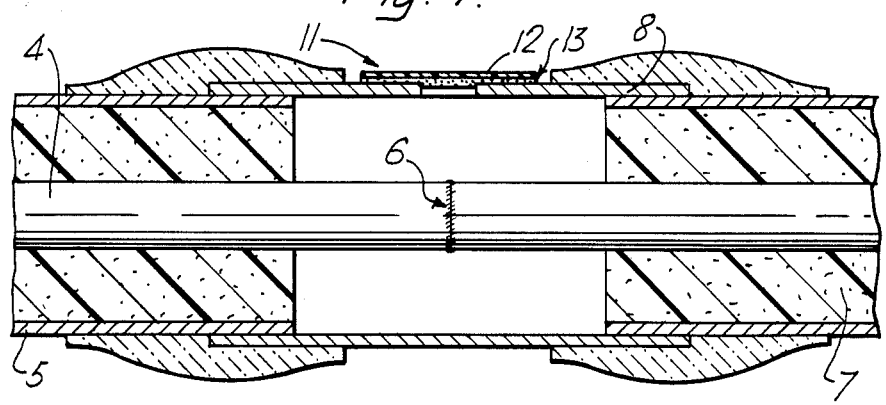

COATED RECOVERABLE ARTICLES

This application is a continuation of application Ser. No. 435,168, filed Oct. 19, 1982, and now abandoned.

DESCRIPTION

The present invention relates to coated recoverable articles for use in protecting pipes from corrosive or other damage or from heat loss, and in particular for sealing joints in district heating pipes against water ingress.

Recoverable wraparound or tubular sleeves can be used to provide protection for welded pipe joints or for pipes themselves, by acting as a barrier to moisture or solvent penetration or to mechanical damage. Such sleeves may comprise a cross-linked polyolefin material coated with a mastic or other sealant. The sleeves are preferably heat recoverable, which means that their dimensional configuration can be made to change substantially when subjected to heat. They will usually recover, on heating, towards an original shape from which they have previously been deformed, but the term "heat recoverable" as used herein also includes an article which on heating adopts a new configuration even if it has not been previously deformed.

In their most common form such articles will recover by shrinking (although internal pipe protection requires expansion) and they will generally be made from a polymeric material which exhibits the property of elastic or plastic memory as defined for example in U.S. Pat. Nos. 2,027,962, 3,086,242 and 3,597,372. As is made clear in for example, U.S. Pat. No. 2,027,962 the original dimensionally heat-stable form may be a transient form in a continuous process in which, for example, an extruded sheet is expanded whilst hot to a dimenionally heat-unstable form; but, in other applications, a preformed heat stable article is deformed to a dimensionally heat unstable form in a separate stage. These patents are incorporated herein by reference.

In the production of heat-recoverable articles, the polymeric material may be cross-linked at any stage in the production of the article that will enhance the desired dimensional recoverability. One manner of producing a heat recoverable article comprises shaping the polymeric material into the desired heat-stable form, subsequently cross-linking it, heating the article to a temperature above the crystalline melt point (or for amorphous materials the softening point) of the polymer, deforming the article and cooling the article whilst in the deformed state so that the deformed state of the article is maintained. In use since the deformed state of the article is heat-unstable, application of heat will cause the article to assume its original heat-stable shape.

In other articles, as described for example in UK Patent No. 1440524 an elastomeric member such as an outer tubular member is held in a stretched state by a second member such as an inner tubular member which upon heating weakens and allows the elastomeric member to recover. The weakening of the inner member could alternatively be by contact with a solvent.

For the sealant coating of sleeves for pipe protection one can use any suitable materials (herein referred to as sealants) which have a cohesive strength of the same order as their adhesive strength, and which are used to fill voids and interstices to provide a seal against moisture, dusts, solvents and other fluids. Sealants are viscid, water resistant macromolecular compositions resembling non-newtonian fluids in exhibiting both viscous and elastic response to stress. They exhibit, in the sense of ASTM 1146, at least second order cohesive blocking (and preferably second order adhesive blocking to metals as well) at a temperature between room temperature and the crystalline melt or glass transition temperature or range of the composition. Known sealant compositions usually comprise mixtures of elastomers, or mixtures of thermoplastic polymers, or both. See Bullman, Adhesives Age, November 1976, pages 25-28 for information on hot melt sealants.

The sealant coating is preferably a mastic, i.e., any suitable adherent, cohesive sealing material which can fill a gap between two articles, and which can deform or yield plastically by undergoing viscous flow during application and in subsequent service at ambient temperatures. Mastics may consist of mixtures of substantially non-crystalline materials, for example bituminous materials, elastomers, or thermoplastic polymers, and may contain inert or powdered fillers.

Where the recoverable sleeve is of the wraparound type, it will generally be necessary to provide some means of maintaining it in the wrapped configuration. One way of doing this is to provide upstanding rails along longitudinal edges of the sleeve which are held together by a channel, as described in our U.K. Patent No. 1155470. An alternative method is to overlap the wraparound sleeve and to apply a patch over the overlap. The patch is generally a polyolefin based sheet covered with a high shear hot-melt adhesive, and may also have a contact adhesive to hold patch secure during installation. Suitable patches are described in U.S. Pat. Nos. 3,770,556 and 4,200,676 and in UK Patent Publication No. 2056192, the disclosures of which are incorporated herein by reference.

Now that the structure of this type of pipe protection sleeve has been described, its installation and function will briefly be mentioned as an introduction to a problem that can be encountered under particularly unfavourable conditions.

When district heating pipes, which typically consist of a steel transport pipe insulated by a foam and an outer polyethylene jacket, are to be joined, a length of insulation is first removed in order than the joint be easily made. Joints are generally made by welding and the heat required would damage any insulation close to the weld line. After the transport pipes have been welded the insulation must be made good across the weld, and since many types of insulation and transport pipes are impaired by the presence of water, it is desirable to provide a water seal when making good this insulation. One way of doing this is to encase the exposed regions of transport pipe using half-shells of insulation, or half-shells of sheet material which are then filled with an insulating material. A seal is then provided across the entire joint or between each end of the pair of half-shells and the adjacent pipe insulation. This seal can be provided by a mastic coated recoverable sleeve.

Joints in simple jacketed pipes may also be protected by mastic sleeves.

Such sleeves may be installed in the following way. Firstly the weld region or other part to be protected is gently pre-heated and the recoverable sleeve is placed in position. This pre-heating reduces installation time and improves bonding. If the sleeve is a wraparound sleeve, it is secured in the wrap configuration by a patch or channel as mentioned above. The sleeve is then heated which causes it to shrink against the pipe or the insulation and causes the mastic to flow under the compressive force of the sleeve, thus filling any voids which may otherwise exist between irregularities on the surface of the pipe or insulation and the recoverable sleeve.

When the sleeve is installed and the pipe has cooled down some residual tension will remain in the sleeve if its size has been chosen correctly. This is a useful feature since any voids subsequently formed by expansion and contraction or flexing of the pipe will automatically be filled. Also, any cut-through damage to the sleeve will be self-sealed by mastic being forced into the hole due to this residual tension acting on the mastic.

These advantages of using a sealant which can undergo viscous flow and which will not crack make this sytem of pipe protection very successful. However in some applications there can be the accompanying disadvantage of slow creep of the sleeve along the pipe. A pipe and its covering are subjected to very large forces due to earth movements and to pipe expansion or contraction which can slide the sleeve relative to the pipe. Small movements will not matter, especially if the sleeve is protecting a weld join since the width of the sleeve is larger than the width of pipe that needs protecting, but eventually some repair or re-covering will be required.

We have now desired a modified pipe protection sleeve, especially useful for providing a water barrier across joints in district heating pipes, which can overcome this problem and which provides a double sealing system by using a hot-melt adhesive to bond the sleeve to the pipe. This double sealing can be achieved while ensuring the advantages of a flexible seal.

Thus, the present invention provides a sleeve suitable for covering a pipe and comprising:
 a recoverable polymeric sheet material;
 a sealant (as herein defined); and
 a heat-activatable adhesive;
the material of the sleeve having:
(A) the sealant as a first region of a principal surface thereof; and
(B) the heat-activatable adhesive as a second region of said surface, which adhesive forms, when the sleeve is in use, a substantially annular bond between the pipe and the polymeric sheet material.

The sealant (or the adhesive) constituting a region of a principal surface of the sleeve is an outwardly facing layer at that region, rather than some intermediate layer of a multi-layer laminate, although the sealant may be covered by, for example, a release layer which has no function in the installed product. Where the sleeve is used to protect the outside of a pipe, the sealant and adhesive will of course be on the internal surface of the sleeve.

In a preferred embodiment, the present invention provides a joint between insulated pipes which comprises: (a) two transport pipes joined together; (b) insulation on each transport pipe which ends short of the joint; (c) a casing surrounding the exposed portion of pipe; (d) a sleeve which provides a seal between and end of the casing and the adjacent pipe insulation, and which comprises a recoverable polymeric material coated at discrete regions with a sealant and a heat-activatable adhesive, the sealant bridging the end of the casing and the pipe insulation to form seals therebetween, and the adhesive forming substantially annular bonds between the sleeve and the casing and between the sleeve and the pipe insulation.

The invention also comprises a method of covering a portion of a pipe, which method comprises securing a sleeve of the invention around the pipe, and heating the sleeve to cause (a) shrinkage of the recoverable polymeric sheet material, (b) softening of the sealant and (c) activation of the adhesive.

The recoverable polymeric sheet material is preferably heat recoverable, and heating will cause the sheet to recover, the sealant to soften and the heat-activatable adhesive to melt or otherwise to become activated and bond to the pipe. The size and shape of the region of hot-melt or other heat-activatable adhesive is not critical, but will generally be such as to prevent slipping of the sleeve or prevent the ends of the sleeve parting company from the pipe. We have found that an annular bond will give the desired benefits, but this is not to be construed as limited to a complete closed ring of bonding around the pipe. In some circumstances it will be sufficient to provide spots or patches of heat-activatable adhesive arranged around the circumference of the pipe such that the envelope of such spots or patches is generally annular in shape. Although one region of heat-activatable adhesive can be sufficient we prefer that two be provided, one at each end portion of the sleeve. The sleeve will then have a middle region of sealant, which can overlie a pipe weld, and two end regions of heat-activatable adhesive which can bond to the pipe jacket.

It is often advantageous that a region of mastic or other sealant be surrounded by regions of heat-activatable adhesive since the latter can act as a dam to prevent undesirable flow of mastic during installation or use.

The precise construction of the sleeve will depend on the specific application, and the variables to be considered include the following; width of sleeve, shrink ratio of sleeve, size, shape and number of regions of heat-activatable adhesive, thickness of sealant and thickness of adhesive, and the nature of the sealant and of the adhesive. The sleeve will conveniently be produced and supplied in long spooled lengths so that a suitable length can be cut-off, depending on the diameter of pipe to be protected.

The nature of the sealant and adhesive will first be considered. Where the recoverable material is heat recoverable it is preferred that the recovery temperature of the material, the softening temperature of the sealant and the activation temperature of the adhesive be compatible. The sleeve can be coated with a temperature indicating composition to give the worker an indication when sufficient heat has been applied. For examples of suitable compositions see our UK patent specification Nos. 2038478 and 2077919. Typical installation temperatures are from 90°–150° C., preferably 110°–135° C. and a typical range of safe operating temperature of the installed sleeve is from −30° to 70° C. The adhesive of the sleeve (and of a closure patch were used) is preferably a hot-melt adhesive, and many types can be used, see for example U.S. Pat. Nos. 4,181,775 and 4,018,733 which disclose formulations comprising polyamides modified with hydrocarbon waxes, and mixtures of acidic ethylene polymers polyamides and tackifiers. Also suitable are EVA compositions including hydrocarbon waxes and optionally butyl rubber. A particularly preferred adhesive, especially for use on untreated substrates and where excellent low temperature performance is required, is that disclosed in UK patent publication No. 2075991, incorporated herein by reference. This publication discloses a hot-melt adhesive composition comprising a polyamide and up to 10% by weight, preferably up to 5%, more preferably from 0.2-0.75% of an acrylic rubber. The composition preferably includes an ethylene/acrylic terpolymer, the preferred amount of which is from 10-20% based on the weight of the polyamide. The terpolymer may comprise for example ethylene, an ethylenically unsaturated mono- or di-carboxylic acid, and a vinyl ester of a $C_1$-$C_6$ straight or branched chain aliphatic carboxylic acid. The combination ethylene/acrylic acid/butyl acrylate is preferred. Instead of the terpolymer, the composition may include a copolymer of ethylene and a $C_2$-$C_{20}$ aliphatic ester of a monoethylenically unsaturated mono- or di-carboxylic acid, or a copolymer of ethylene and vinyl acetate. The acrylic rubber may be supplied by compositions containing these terpolymers or co-polymers. The preferred polyamides have a number average molecular weight of 2000-10000, a softening point of 90°-150° C., and an amine equivalent of from 70-400 (amine equivalent being the number of milliequivalents of perchloric acid required to neutralize one kilogram of the polyamide. The polyamides are preferably based on dibasic acids, especially dimer acids, although small amounts of tribasic and higher acids, eg trimer acid, may be present it is preferred that they should not total more than 10% by weight of the acid component of the polyamide. Typical polyamides are condensation interpolymers of at least one diamine with one or more dibasic acids. The polyamides preferably have a glass transition temperature below 10° C., more preferably below 0° C. A liquid polyamide may be added as a further component.

Other types of hot-melt adhesives can be used in addition to those which can be reversibly softened and hardened, and within the term "hot-melt adhesive" we include thermosets, which can be reacted to soften and which then irreversibly cure. Whichever type of heat-activatable adhesive is used, it must provide a bond between the sleeve and the pipe, and in general it can be regarded as forming a second seal thus providing additional environmental protection. The excellent bond between the sleeve and the pipe that can be achieved by using such adhesive in conjunction with the mastic or other sealant provides the seal with considerable dimensional integrity. Thus, flexible seals can be constructed which can withstand considerable pressure, and can therefore be pressure tested to ensure perfect sealing.

The hot-melt adhesive can be coloured with a pigment to allow a clear indication when the adhesive has melted sufficiently to appear at the ends of the sleeve. It is envisaged that the sleeves of this invention will be useful in conjunction with pre-insulated pipes having polyethylene jackets, as well as those having more readily bondable surfaces such as PVC. The polyamide and other formulations mentioned above are suitable for bonding to polyethylene, and excellent bonding is possible if the usual surface treatment is performed.

The sealant, as mentioned above, is preferably a mastic such as that described in U.S. Pat. No. 3,197,819. A preferred formulation is a blend of atactic polypropylene and polyisobuytylene, optionally with a tackifier, but other products will be acceptable. Since at room temperature most mastics are tacky the sleeve is preferably coated over at least the mastic region with a release paper. The mastic or other sealant, as a result of its flexibility, provides the sleeve with self-sealing and void filling properties and acts as an excellent barrier to water and to other environmental contaminants.

The size of the sleeve will be chosen to match the pipe or pipe weld to be protected. In general, we prefer the length of a wraparound sleeve to be from 120-220 mm greater than the circumference of the pipe jacket for jackets of diameter 150 mm-260 mm. These figures should be used where a patch is used to hold the sleeve in the wrapped configuration. Where the closure means is by rail and channel, and where the sleeve is tubular, the circumference of the sleeve should be only slightly greater than that of the pipe jacket to allow some unresolved recovery to remain in the sleeve after heating.

Where the sleeve is used to protect a weld join in a plastic jacketed pipe the width of sleeve required will depend on the extent to which the jacket has been removed either side of the weld; what is necessary is that the sleeve overlaps the jackets on each side of the weld a sufficient amount. The following sizes can, however, be regarded as illustrative: total width of sleeve from 200-250 mm (preferably 225 mm) width of central sealant coating 90-110 mm (preferably 100 mm) width of each of two outer adhesive coatings 50-70 mm (preferably 60 mm). The sleeve may conveniently be supplied in long length as a spool, typical lengths being about 30 m.

It is preferred that the central sealant coating and the two outer hot-melt or other heat-activatable adhesive coatings run continuously the whole circumference of the sleeve. However, this is not necessary and the hot-melt adhesive could be applied intermittently along the length of the sleeve. It will of course generally be essential that the sealant coating be continuous so that the complete circumference of any pipe to be covered is protected. The two outer hot-melt adhesive coatings are preferably applied to the recoverable backing as such, but the whole of the backing may be coated with a layer of hot-melt adhesive, and a central region of sealant superposed. In some circumstances a complete backing of hot-melt can act as a useful barrier, providing the sleeve with a double sealant layer.

The width of the sealant coating is clearly determined by the width of pipe to be protected, but the determination of a suitable width of the hot-melt adhesive is more complex. Firstly the amount of hot-melt adhesive must be sufficient to match the forces which tend to slide the sleeve along the pipe, or which tend to force the ends of the sleeve away from the pipe or which tend to reduce the efficiency of the sleeve in other ways.

The optimum thicknesses of the sealant and adhesive will now be considered. The minimum thickness of the adhesive will be governed by the amount necessary to form a good bond to the pipe, which will depend on the size and nature of the pipe jacket, and the maximum thickness will be governed by cost, installation time and prevention of excessive slipping of the sleeve due to the elastic band effect. Preferred thicknesses are from 0.4-2.0 mm, more preferably 0.5-0.9 mm. The thickness of the mastic should be sufficient to ensure proper sealing function against water or fluids and must allow proper filling of voids, step-downs and overlaps along the pipe surface. The thickness of the sealant need not to be a constant across its width, but may be profiled to match the underlying surface. Preferred thicknesses are from 0.8-2.0 mm, more preferably 1.0-1.5 mm. The thickness of each coating must be chosen with the other in mind, and it is important that the sealant is not so thick that it interferes with the bonding of the adhesive to the pipe.

The new sleeve will generally be produced by extrusion as a flat strip but tubular extrusion and cutting is an alternative. The cross-linking and expansion steps can be carried out as part of the same process. Similarly, the coating operation can be made part of the same production line. The precise coating technique will depend on whether the hot-melt adhesive is present as outer strips only (as is preferred) or is present as a complete coating superimposed by a narrower layer of sealant. The two coatings can be applied sequentially or simultaneously. Finally, a release paper can be applied to the sealant coating, and a temperature indicating paint or ink can be applied to an uncoated surface of the recoverable material.

The invention is now further illustrated by the accompanying drawings, in which:

FIG. 4 shows a sleeve around a joint in an insulated pipe;

FIG. 6 shows a second technique for insulating a joint region; and

FIG. 7 a completed joint between two insulated pipes.

Figure 1:
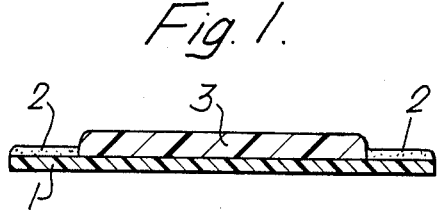
FIG. 1 is a cross-section of a sleeve having a sealant and a hot-melt adhesive coating.
Figure 2:
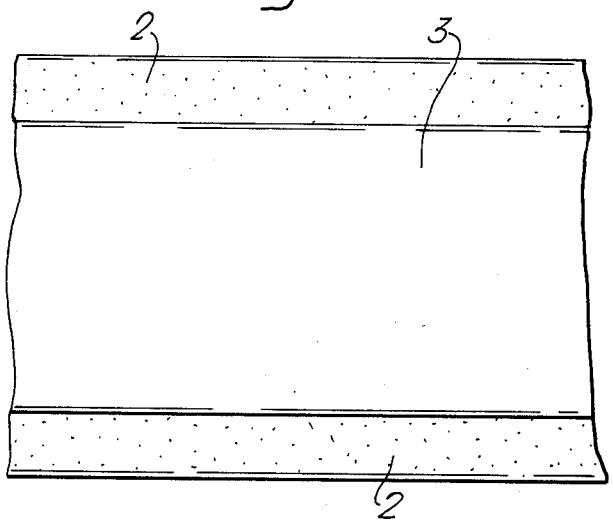
FIG. 2 is a plan-view of the sleeve of FIG. 1.

FIGS. 1 and 2 show a recoverable polymeric sheet material 1 (recovery ratio preferably 25–30%) of thickness about 1 mm coated with two strips 2 of hot-melt adhesive of width 50–70 mm, preferably about 60 mm, and thickness about 0.7 mm, and with a central coating of a mastic of width about 100 mm and thickness about 1.4 mm. The total width of the sleeve is about 225 mm, and a section only of its length is shown in FIG. 2. The exposed surface of the mastic 3 thus constitutes the first region so called, and the exposed surfaces of the adhesive 2 constitute the second region so called. If desired, the adhesive 2 could extend across the width of the sleeve 1 underneath the mastic 3: the mastic then lying on top of the adhesive.

Figure 3:
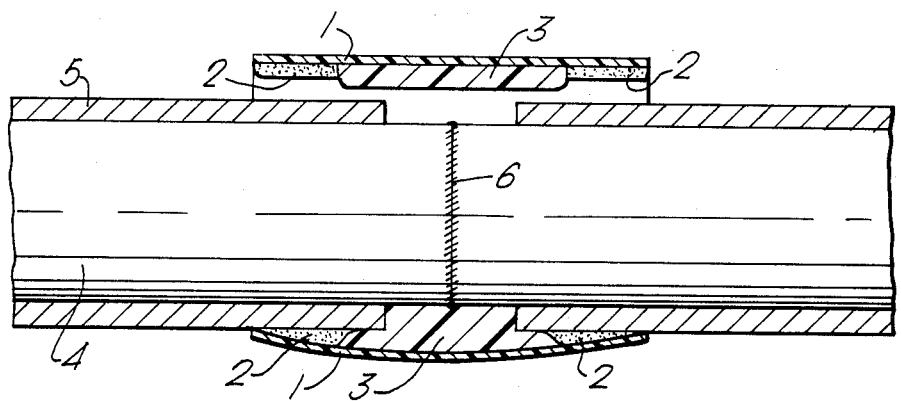
FIG. 3 shows a sleeve around a jacketed pipe.

FIG. 3 shows a pipe 4 having a weld joint 6 to be protected. When the weld 6 was made it was necessary to remove a certain amount of the jacket 5 to prevent it being damaged by the heat required for welding. The region of bare pipe between the jackets is to be protected by the sleeve of the invention. The sleeve is shown above the pipe before heat-recovery and below the pipe after heat recovery. The mastic 3 can be seen to have filled the step-down and any voids on the pipe surface. The hot-melt adhesive 2 has bonded to the jacket and a little lateral shrinkage has occurred.

The mastic 3 is self-sealing and can thus accommodate movement in the pipe due to earth movements or thermal contractions and expansions. Also, damage to the sleeve 1 will not be serious since any holes or cuts will be filled by the mastic which is able to flow at most temperatures that the product is likely to encounter. Residual tension in the sleeve can be arranged to ensure that the mastic flows into any voids. A good environment and moisture seal is thus produced by the mastic. The hot-melt adhesive 2 provides a second seal and it bonds to the pipe to prevent any long term movements of the sleeve 1 along the pipe. As a result the mastic is securely held in place over the weld region of the pipe from which the jacket 5 has been removed.

FIGS. 4–7 show the application of an embodiment of the invention to a joint in an insulated pipe. Such pipes are used in district heating systems, and joints will in general require moisture and environmental sealing, and also continuity of insulation. The invention is particularly useful in conjunction with district heating pipes having a steel transport pipe surrounded by polyurethane foam and a polyethylene jacket. Excellent results are however obtained with other transport pipes such as copper or cross-linked polyethylene, with other insulations such as glass wool, and with other outer jackets such as PVC or asbestos cement.

These figures show pipes 4 surrounded by insulation, here shown as polyurethane foam 7 and an outer jacket 5. In each of the figures two pipes are joined by a weld line 6, although other joining techniques could be used.

In FIG. 4 the exposed portions of pipe are surrounded by a casing 8. The ends of the casing 8 are joined to respective pipe insulations 7 and 5 by means of the sleeve of the invention. The left-hand side of FIG. 4 shows the sleeve in place around the pipe but before shrinkage and activation and softening of the coatings, and the right-hand side of the figure shows the finished installation. As in the earlier figures, the sleeve comprises a recoverable polymeric material 1 with a sealant coating 3 and two hot-melt adhesive coatings 2. In this case, however, the hot-melt adhesive coating extends the width of the sleeve and underneath the sealant 3.

Figure 5:
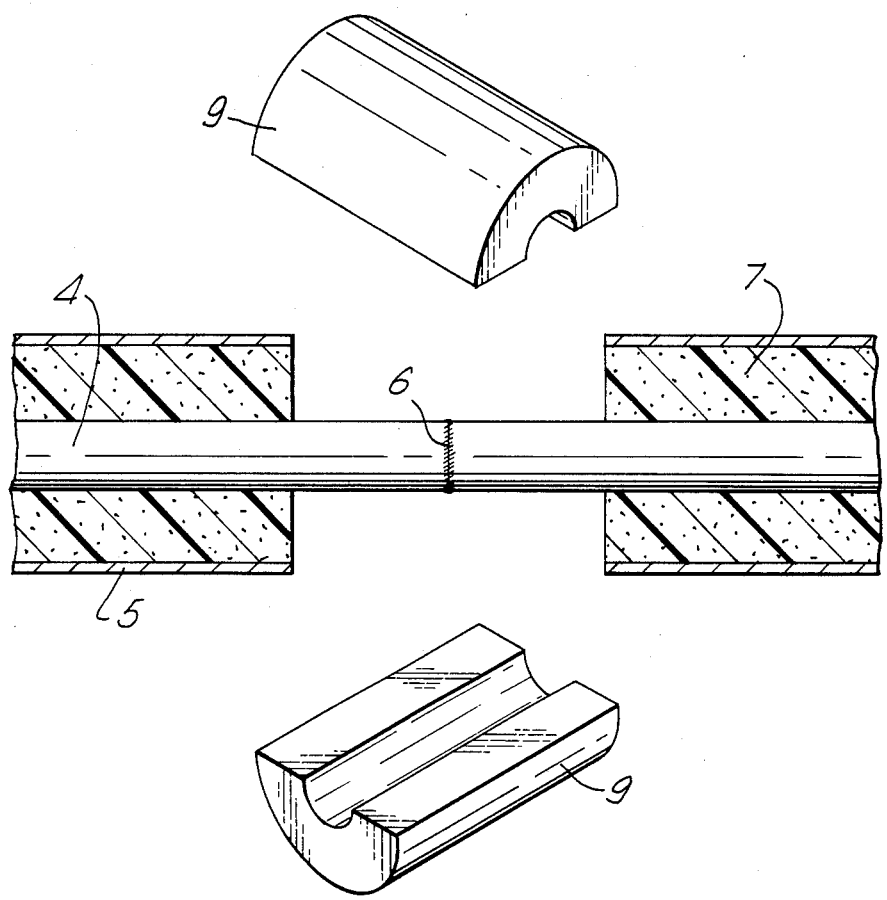
FIG. 5 shows one technique for insulating a joint region.

The casing of FIG. 4 is of sheet material and thus defines an annular space around the joined pipes, the ends of the annular space being defined by insulation 7 and 5 of each pipe. The casing may be tubular (requiring access to a free end of pipe for installation) or may be wrap-around. Various types of wrap-around casing may be provided, such as separate half-shells, hinged half-shells, sheet which is simply wrapped around the joint and secured by closure means such as adhesive bond, a frame plus external sheet or tape wrapping, and multi-segmented casing. The situation illustrated in FIG. 5 is somewhat different. Here, the casing comprises two half-shells 9 of insulating material which are assembled around the exposed pipe ends to make good the pipe insulation that had to be removed (or omitted) in order to make the pipe joint. These half-shells may simply be blocks of foam or other insulating material or they may comprise more than one component, such as insulating material plus an outer jacket; in either case, the sleeve of the invention is applied to provide a seal across the joins between the casing and the existing pipe insulation, or from one pipe insulation to the other.

FIGS. 6 and 7 show a casing 8 of substantially sheet material, but with means for providing continuity of thermal insulation across the pipe joint. Where the invention is used on a district heating, or other high temperature pipe, a continuous heat insulation will clearly be desirable. On other pipes it may be sufficient to provide a continuous moisture or environmental seal. The means by which this continuity of thermal insulation may be provided is a hole 10 in the material of the casing 8. After the casing 8 has been installed around the joined pipes, and preferably after the sleeves 1 have been secured in place, an insulating material is introduced through the hole 10 to fill the annular space around the joined pipes. The insulating material is preferably a liquid which is poured through the hole 10 and which then foams in situ. Polyurethane foam is peferred.

After the insulating material has been introduced (and where necessary after foaming is complete) the hole 10 is preferably stopped in order that the insulating material be protected against moisture. This can be done by providing a single sleeve 1 of sufficient width to extend from one pipe insulation 5 to the other, instead of the two separate sleeves 1 as illustrated. However, better results have been obtained by stopping the hole 10 with closure means 11 as shown in FIG. 7. Closure means 11 comprises a polymeric backing sheet 12 and an adhesive coating 13. The backing sheet 12 is preferably a dimensionally stable cross-linked polyolefin and the adhesive 13 is preferably a hot melt or otherwise heat-activatable adhesive. The adhesives mentioned above as constituting the second region of the sleeve may also be used here. Where the adhesive is heat-activatable, the backing sheet 12 may be provided on its exposed surface with a temperature indicating composition (such as a paint which changes colour) to help the installer judge when sufficient heat has been applied to produce a satisfactory bond.

In general the closure means 11 will be circular or substantially square (having rounded-of corners) and substantially smaller than the length of the casing 8. A typical size would be from 70–150 mm, more typically about 110 mm, in diameter when circular, and of comparable size when substantially square.

The closure means 11 may be used in conjunction with a plug of solid (rather than sheet) material. The plug may be retained, or may be used temporarily until the insulating material had set or finished foaming and then removed before application of the closure means 11. It may be preferred that the plug be removed where the completed joint is to have a highly uniform surface, and where earth movements are likely to damage it. However, in certain circumstances the plug may be left in place and the closure means 11 used for additional protection.

We claim:

1. An assembly for sealing an end of a joint between two insulated pipes from which the insulation has been removed at the ends thereof exposing uninsulated end portions, said assembly comprising:
   (a) a hollow casing arranged to surround the uninsulated portions of pipe, overlapping the pipe insulation at each side of the joint; and
   (b) a sleeve comprising a heat-recoverable polymeric sheet having;
      (i) a layer of a heat-activatable adhesive at two first regions of a principle surface thereof, arranged so as in use to provide substantially annular bonds between the polymeric sheet and the casing and between the polymeric sheet and the insulation of one of said pipes, so as to interconnect the casing and the pipe insulation, and
      (ii) a layer of a sealant at a second region of the said principle surface, said second region being between the two said first regions, said sealant being distinct from said heat-activatable adhesive and being arranged in use to overlap the casing and the pipe insulation so as to provide substantially annular, flexible seals between the polymeric sleeve and the casing, and the polymeric sleeve and the insulation, thereby providing a flexible seal between the casing and the insulation which can accommodate relative movement between the casing and the insulation.

2. An assembly according to claim 1, in which the layer of heat-activatable adhesive is arranged such that the annular bond is continuous around the circumference of the pipe.

3. An assembly according to claim 1, in which the sealant is a mastic.

4. An assembly according to claim 3, in which the mastic comprises an atactic polypropylene and polyisobutylene.

5. An assembly according to claim 1, in which the heat-activatable adhesive is selected from the group consisting of
   (a) a hot melt adhesive comprising an EVA and a hydrocarbon wax;
   (b) a hot melt adhesive comprising a polyamide and a hydrocarbon; and
   (c) a hot melt adhesive comprising a polyamide and up to 10% by weight of the polyamide of an acrylic rubber.

6. An assembly according to claim 1, in which the polymeric sheet has a recovery ratio from 25–31%.

7. An assembly according to claim 1, having a temperature indicating composition on a surface of the polymeric sheet which faces away from the said principal surface.

8. An assembly according to claim 1, in which the casing comprises half-shells of an insulating material.

9. An assembly according to claim 1, which further comprises a foamable material to fill the said annular space to provide insulation around the joint.

10. An assembly according to claim 1, in which the sleeve is a wrap-around sleeve.

11. An assembly according to claim 10, wherein the recoverable polymeric sheet is in the form of a roll, the first and second regions being strips running substantially continuously along the length of the roll.

12. An assembly according to claim 10, which further comprises a closure patch for retaining the recoverable sleeve around the insulated pipe prior to recovery, the patch comprising a polymeric sheet coated wtih a heat-activatable adhesive.

13. A method of sealing a joint between two insulated pipes, the insulations of each of which having been removed at the ends thereof exposing uninsulated end portions, which method comprises:
   (a) surrounding the exposed, uninsulated portions of pipe with a hollow casing, overlapping the pipe insulation at each side of the joint;
   (b) joining an end of the casing to the adjacent pipe insulation by installing around the end of the casing a sleeve comprising a heat-recoverable polymeric sheet having:
      (i) a layer of a heat-activatable adhesive at two first regions of a principle surface thereof, arranged so as in use to provide substantially annular bonds between the polymeric sheet and the casing and between the polymeric sheet and the insulation of one of said pipes, so as to interconnect the casing and the pipe insulation, and
      (ii) a layer of a sealant at a second region of the said principle surface, said second region being between the two said first regions, said sealant being distinct from said heat-activatable adhesive and being arranged in use to overlap the casing and the pipe insulation so as to provide substantially annular, flexible seals between the polymeric sleeve and the casing, and the polymeric sleeve and the insulation, thereby providing a flexible seal between the casing and the insulation which can accommodate relative movement between the casing and the insulation; and (c) causing the polymeric material to recover, the sealant to soften and the heat activatable adhesive to be activated.

14. A method according to claim 13, in which the casing comprises half-shells of an insulating material, the thickness of the insulating material being substantially equal to the thickness of the pipe insulation.

15. A method according to claim 13, which additionally comprises filling said annular space, after installation of the casing, with an insulating material.

16. A method according to claim 15, in which the space is filled by pouring the insulating material into said annular space via a hole in the casing.

17. A method according to claim 15, in which the insulating material is a liquid which foams when in said annular space.

18. A method according to claim 15, which additionally comprises covering the hole after introduction of said insulating material, by means which comprise a polymeric backing sheet coated with an adhesive by means of which the backing material is bonded to the casing.

19. A method according to claim 18, in which the backing is coated with a heat-activatable adhesive on one major surface and a temperature indicating composition on an opposite surface, the closing means being installed by heating until the temperature indicating composition indicates activation of the adhesive.

20. A method according to claim 13, in which a separate said sleeve is installed around each end of the casing.

21. A method according to claim 13, in which the insulated pipe comprises a steel pipe, insulated by polyurethane foam surrounded by a polyethylene jacket.

22. A joint between insulated pipes, which comprises:
(a) two transport pipes joined together;
(b) insulation on each transport pipe which ends short of the joint exposing uninsulated end portions;
(c) a hollow casing surrounding the exposed, uninsulated portion of the pipes overlapping the insulation at each side of the joint;
(d) a sleeve which provides a seal between an end of the casing and the adjacent pipe insulation, and which comprises a heat-recoverable polymeric sheet having:
  (i) a layer of a heat-activatable adhesive at two first regions of a principle surface thereof, arranged so as in use to provide substantially annular bonds between the polymeric sheet and the casing and between the polymeric sheet and the insulation of one of said pipes, so as to interconnect the casing and the pipe insulation, and
  (ii) a layer of a sealant at a second region of the said principle surface, said second region being between the two said first regions, said sealant being distinct from said heat-activatable adhesive and being arranged in use to overlap the casing and the pipe insulation so as to provide substantially annular, flexible seals between the polymeric sleeve and the casing, and the polymeric sleeve and the insulation, thereby providing a flexible seal between the casing and the insulation which can accommodate relative movement between the casing and the insulation.

23. A joint according to claim 22, having two said sleeves, one at each end of the casing.

24. A joint according to claim 22, in which the casing has a hole in the material thereof, the hole being covered by a closure means comprising a polymeric backing sheet coated with an adhesive by means of which the backing sheet is bonded to the casing.

* * * * *

UNITED STATES PATENT AND TRADEMARK OFFICE
CERTIFICATE OF CORRECTION

PATENT NO.    : 4,732,412

INVENTOR(S)  : van der Linden et al.

DATED         : March 22, 1988

It is certified that error appears in the above-identified patent and that said Letters Patent is hereby corrected as shown below:

```
Column 2, line 66, replace "wrap" by --wrapped--.
Column 3, line 26, replace "desired" by --devised--.
```

Signed and Sealed this

Twenty-eighth Day of June, 1994

Attest:

BRUCE LEHMAN

*Attesting Officer*      *Commissioner of Patents and Trademarks*